US012688060B2

(12) United States Patent
Brown et al.

(10) Patent No.: US 12,688,060 B2
(45) Date of Patent: Jul. 21, 2026

(54) SECURING AND OPTIMIZING MULTI-DOMAIN DATA ACCESS USING WORKFLOW PARALLELIZATION

(71) Applicant: State Farm Mutual Automobile Insurance Company, Bloomington, IL (US)

(72) Inventors: Richard Carl Brown, Normal, IL (US); Ryan Leverton, Bloomington, IL (US); Stephanie Langland, El Paso, IL (US); Keith Sartain, Yorkville, IL (US); Deepak Maheshwari, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 368 days.

(21) Appl. No.: 18/462,280

(22) Filed: Sep. 6, 2023

(65) Prior Publication Data

US 2025/0077268 A1     Mar. 6, 2025

(51) Int. Cl.
*G06F 9/46* (2006.01)
*G06F 9/38* (2018.01)

(52) U.S. Cl.
CPC ............ *G06F 9/468* (2013.01); *G06F 9/3824* (2013.01)

(58) Field of Classification Search
CPC ............................... G06F 9/468; G06F 9/3824
See application file for complete search history.

(56) References Cited

U.S. PATENT DOCUMENTS

| | | | |
|---|---|---|---|
| 8,170,609 | B2 | 5/2012 | Hedtke et al. |
| 11,087,023 | B2 | 8/2021 | Feuz et al. |
| 11,170,285 | B2 | 11/2021 | Aggarwal |
| 2017/0372429 | A1 | 12/2017 | La Placa |
| 2023/0342186 | A1* | 10/2023 | Arunachalam ....... G06F 9/4881 |
| 2024/0007525 | A1* | 1/2024 | Zhang ....................... H04L 9/50 |
| 2025/0005702 | A1* | 1/2025 | Dziezanowski ........ G06F 9/542 |

* cited by examiner

*Primary Examiner* — Craig C Dorais
(74) *Attorney, Agent, or Firm* — Lee & Hayes, P.C.

(57) ABSTRACT

This disclosure describes a system for securely and efficiently accessing enterprise data stored across heterogeneous databases and domains. In some examples the system employs a parallelized workflow architecture that optimally invokes specialized workflows to retrieve requested data fields in parallel rather than in a serial sequence. The system may utilize multi-factor authentication including public/private keys and authentication tokens to validate user identities and access privileges. An intelligent execution manager may analyze metadata in data access requests to determine the optimal set of workflows to invoke to retrieve the requested data. These workflows may execute concurrently to query backend domain interfaces that abstract away complex underlying data storage systems. The domain interfaces may return requested data fields which are consolidated and returned to the requester. Accordingly, the system scalable and performant data access with fine-grained access controls across large enterprises.

20 Claims, 6 Drawing Sheets

200

300

Figures 4A, 4B:
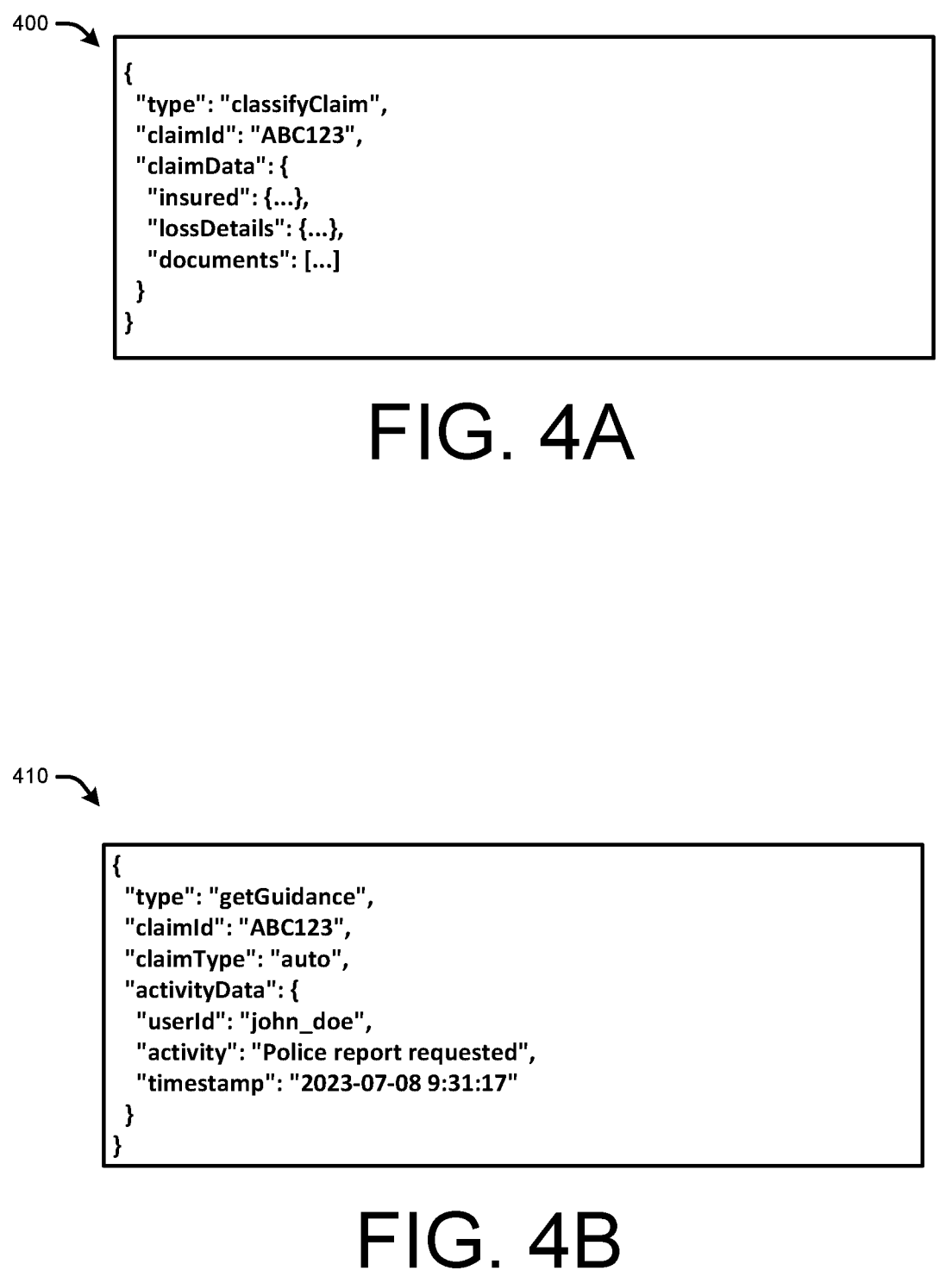

400

```
{
  "type": "classifyClaim",
  "claimId": "ABC123",
  "claimData": {
    "insured": {...},
    "lossDetails": {...},
    "documents": [...]
  }
}
```

```
{
  "type": "getGuidance",
  "claimId": "ABC123",
  "claimType": "auto",
  "activityData": {
    "userId": "john_doe",
    "activity": "Police report requested",
    "timestamp": "2023-07-08 9:31:17"
  }
}
```

RECEIVE DATA ACCESS REQUEST
502

DETERMINE ACCESS SCOPE
504

DETERMINE APPLICABLE WORKFLOWS
506

INITIATE WORKFLOWS
508

DETERMINE OUTPUT DATA
510

PROVIDE OUTPUT DATA TO CLIENT-SIDE AUTHORIZATION MANAGEMENT
512

SECURING AND OPTIMIZING MULTI-DOMAIN DATA ACCESS USING WORKFLOW PARALLELIZATION

TECHNICAL FIELD

The present disclosure relates to data access management, and more particularly to techniques for coordinated and parallelized access to a multi-domain data storage platform.

BACKGROUND

Enterprise organizations rely on the ability to access large datasets spread across diverse databases and data storage systems. However, retrieving data in an efficient and secure manner remains challenging. Existing methods like submitting sequential queries or accessing each system independently are slow and cumbersome. At the same time, giving users direct access risks data leakage if improper access controls are applied. Accordingly, there is a need for an intelligent data access mechanism that provides centralized control, access governance, and parallelized execution to accelerate enterprise data access.

Examples of the techniques described in the present disclosure are directed to overcoming the deficiencies noted above.

SUMMARY

In some aspects, the techniques described herein relate to a computer-implemented method, including receiving, by a processor of a parallel computing platform, a data access request, wherein the data access request represents an access scope, and the parallel computing platform can request execution of a first workflow that is configured to access a first data domain, a second workflow that is configured to access a second data domain, and a third workflow that is configured to access a third data domain. The techniques further include determining, by the processor, that the access scope intersects with the first data domain and the second data domain but fails to intersect with the third data domain. The techniques further include, in response to determining that the access scope intersects with the first data domain and the second data domain but fails to intersect with the third data domain, initiating, by the processor, parallel execution of the first workflow and the second workflow to receive first target data from the first workflow and second target data from the second workflow. The techniques further include providing, by the processor, output data comprising the first target data and the second target data to a client device, wherein the client device is configured to determine a filtered subset of the output data based on an access privilege level of the data access request and enable user access to the filtered subset.

In additional examples, the techniques described herein relate to a computing system, including: a processor; and memory storing computer-executable instructions that, when executed by the processor, cause the computing system to perform operations including receiving, by the processor, a data access request, wherein the processor is associated with a parallel computing platform, data access request represents an access scope, and the parallel computing platform can request execution of a first workflow that is configured to access a first data domain, a second workflow that is configured to access a second data domain, and a third workflow that is configured to access a third data domain. The techniques further include determining, by the processor, that the access scope intersects with the first data domain and the second data domain but fails to intersect with the third data domain. The techniques further include, in response to determining that the access scope intersects with the first data domain and the second data domain but fails to intersect with the third data domain, initiating, by the processor, parallel execution of the first workflow and the second workflow to receive first target data from the first workflow and second target data from the second workflow. The techniques further include providing, by the processor, output data comprising the first target data and the second target data to a client device, wherein the client device is configured to determine a filtered subset of the output data based on an access privilege level of the data access request and enable user access to the filtered subset.

In further examples, the techniques described herein relate to one or more non-transitory computer-readable media storing computer-executable instructions that, when executed by the processor, cause the one or more processors to perform operations, including receiving, by the processor, a data access request, wherein the processor is associated with a parallel computing platform, the data access request represents an access scope, and the parallel computing platform can request execution of a first workflow that is configured to access a first data domain, a second workflow that is configured to access a second data domain, and a third workflow that is configured to access a third data domain. The techniques further include determining, by the processor, that the access scope intersects with the first data domain and the second data domain but fails to intersect with the third data domain. The techniques further include, in response to determining that the access scope intersects with the first data domain and the second data domain but fails to intersect with the third data domain, initiating, by the processor, parallel execution of the first workflow and the second workflow to receive first target data from the first workflow and second target data from the second workflow. The techniques further include providing, by the processor, output data comprising the first target data and the second target data to a client device, wherein the client device is configured to determine a filtered subset of the output data based on an access privilege level of the data access request and enable user access to the filtered subset.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4A provides an example of an application programming interface (A) call by a workflow of a parallel processing platform to a data domain API of a data access platform to access claim data.

FIG. 4B provides an example of an API call by a workflow of a parallel processing platform to a data domain API of a data access platform to access activity data.

DETAILED DESCRIPTION

This disclosure describes systems and methods for securely and efficiently accessing enterprise data stored across heterogeneous databases and domains. In some examples a system employs a parallelized workflow architecture that optimally invokes specialized workflows to retrieve requested data fields in parallel rather than in a serial sequence. The system may utilize multi-factor authentication including public/private keys and authentication tokens to validate user identities and access privileges. An intelligent execution manager may analyze metadata in data access requests to determine the optimal set of workflows to invoke to retrieve the requested data. These workflows may execute concurrently to query backend domain interfaces that abstract away complex underlying data storage systems. The domain interfaces may return requested data fields which are consolidated and returned to the requester. Accordingly, the system may be scalable, and may perform data access with fine-grained access controls across large enterprises.

Figure 1:
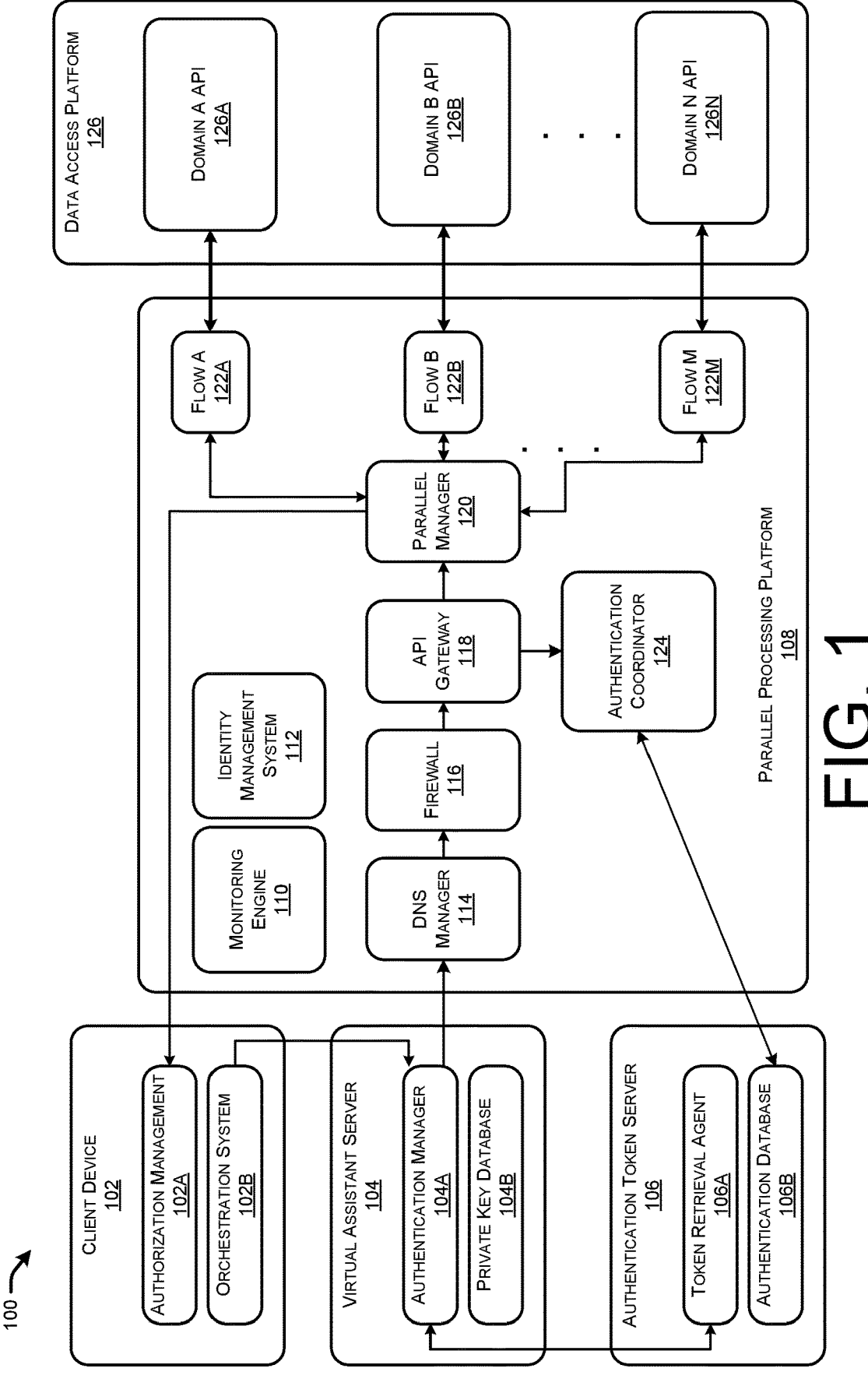
FIG. 1 depicts an example environment for providing secure and efficient data access management using workflows executed in parallel.

FIG. 1 depicts an example environment 100 for providing secure and efficient data access management using workflows executed in parallel. Example environment 100 includes a client device 102, a virtual assistant server 104, an authentication token server 106, a parallel processing platform 108, and a data access platform 126.

The client device 102 may be used by end users, automated processes, or application programming interfaces (APIs) to initiate data access requests to retrieve data from the data access platform 126. The client device 102 may be a laptop, desktop, tablet, smartphone, or any computing device including a processor and capable of network connectivity. When an end user requires data access, the client device 102 generates a data access request that specifies the target data fields required by the end user.

The client device 102 contains an authorization management system 102A that determines the access privilege level of users (e.g., end users, processes, APIs, and/or the like). The authorization management system 102A stores access privilege levels of users that specify data fields the user is authorized to have access to. When the client device 102 receives output data from the workflows, the authorization management system 102A filters the output data to only allow access to data fields covered by the user's access privilege level to ensure users only retrieve data they are authorized to access.

The client device 102 also contains a container orchestration system 102B like an Amazon® EC2 Container Service (ECS) that submits data access requests to trigger workflow execution. The container orchestration system 102B packages the data access request into a standardized format with necessary metadata like requestor details, request type, target entity type, etc. and submits the data access request to the virtual assistant server 104 to trigger the data retrieval process. The container orchestration system 102B may utilize container technology like Docker containers to facilitate packaging and transmission of data access requests.

The virtual assistant server 104 contains components to initiate the authentication process for data access requests. The virtual assistant server 104 can be implemented using a cloud provider like Salesforce®. The virtual assistant server 104 contains an authentication manager 104A which can be an intelligent virtual assistant engine like the Salesforce Einstein™ advisor. The authentication manager 104A receives data access requests from the container orchestration system 102B on the client device 102.

To authenticate the requests, the authentication manager 104A retrieves public keys associated with the requesting client device and/or user from a private key database 104B. The private key database 104B stores private keys mapped to client devices and users. When a data request is received, the authentication manager 104A obtains the requestor details in the private key database 104B to identify the associated private key. The authentication manager 104A then derives the corresponding public key, which will be used by the authentication token server 106 to verify the authenticity of the requestor.

The authentication manager 104A then submits the public key in a request to the authentication token server 106 to get an authentication token proving the requestor's identity. The authentication token server 106 contains components to generate authentication keys such as JSON Web Token (JWT) authentication tokens. The authentication token server 106 can be hosted on a cloud provider like Microsoft® Azure® and operate as the central authority for issuing authentication tokens.

The authentication token server 106 contains a token retrieval agent 106A that verifies public keys and retrieves corresponding authentication tokens. The token retrieval agent 106A may be implemented using Apex code running on a Microsoft® Azure® server or cluster of servers. When the authentication token server 106 receives a request with a public key from the authentication manager 104A, the token retrieval agent 106A first verifies that the public key is valid and matches the requester details. The authentication token server 106 may perform this verification by comparing against public keys stored in the authentication database 106B.

The authentication database 106B may be an Azure® Active Directory instance and store valid public keys mapped to client devices and users. Token retrieval agent 106A queries the authentication database 106B to verify the public key is associated with the requester and has not been revoked or block-listed. If the public key is successfully verified, the token retrieval agent 106A then proceeds to generate an authentication token from the authentication database 106B. The authentication database 106B contains pre-generated tokens mapped to requestors. The token retrieval agent 106A then retrieves the token corresponding to the requestor and returns it to the authentication manager 104A. In some cases, the token may be dynamically generated on-the-fly by the token retrieval agent 106A upon verification of the public key.

The authentication manager 104A on the virtual assistant server 104 receives the JWT token and includes it in the data access request payload which it forwards to the parallel processing platform 108. The parallel processing platform 108 may be deployed on a cloud platform like Amazon Web Services® (AWS) and handle executing workflows in parallel to retrieve requested data.

The parallel processing platform 108 may have several components to facilitate the parallel execution of workflows. For example, the parallel processing platform 108 contains a monitoring engine 110 that monitors the execution of the workflows. CloudWatch collects real-time metrics like execution time, failures, and resource utilization about the workflow executions.

The parallel processing platform 108 contains an identity management system 112 that handles access control for administrative functions. Identity management system 112 authenticates administrator users and determines their access privileges to perform functions like deploying new workflows, modifying workflow permissions, etc. The identity management system 112 enables separation of duties for administrative tasks.

The parallel processing platform 108 also contains a domain name services (DNS) manager 114 that routes incoming data access requests to the appropriate components of the parallel processing platform 108. For instance, the DNS manager 114 may route requests to the API gateway 118 for authentication before routing them to the parallel execution manager 120 for workflow execution.

The parallel processing platform 108 also contains firewall engine 116 that analyzes incoming requests to detect and prohibit malicious requests like denial-of-service attacks. The firewall engine 116 approves data access requests before authorizing provision of those requests to downstream components like the API gateway 118. The firewall engine 116 may operate as the first line of defense against abuse of the data access infrastructure.

The API gateway 118 may validate authentication tokens associated with data access requests before allowing further processing. The API gateway 118 uses authentication coordinator 124 which may be implemented as a lambda authorizer function.

The authentication coordinator 124 may have access to public keys stored in the authentication database 106B of the authentication token server 106. When the authentication coordinator 124 receives a data access request with an authentication token from the API gateway 118, the authentication coordinator 124 first verifies the integrity of the token by checking against tampering using the public key associated with the requester which the authentication coordinator 124 retrieves from the authentication database 106B. Once the authentication coordinator 124 has cryptographically verified the authentication token, the authentication coordinator 124 approves the data access request, allowing the API gateway 118 to provide the request to the parallel execution manager 120. If the authentication token fails verification, the request is denied by API gateway 118. This prevents unauthorized access to protected data.

The parallel execution manager 120 may be a component like the AWS Step Functions service that handles orchestrating the workflows that access datasets in parallel. The parallel execution manager 120 analyzes incoming data access requests to determine access scope requests. The access scope of a data access request may identify what data domains need to be accessed to fulfill the request. The access scope may be determined based on metadata like the request type, and target entity type as well as the specific data fields requested. For example, a request type of "driver verification" and target entity type of "driver" indicates that driver data like driver name, driver birthdate, and driver social security number needs to be retrieved.

The parallel execution manager 120 may determine the access scope of a data access request based on a request type and a target entity type associated with the request. For example, if the request type is verification and the target entity type is a driver, then the access scope may include data domains of a driver data such as driver name, driver birthdate, driver social security number, etc. However, if the request type is verification and the target entity type is a vehicle, then the access scope may include data domains of a vehicle such as vehicle make, vehicle make, vehicle year, vehicle identification number, etc.

Once the parallel execution manager 120 has determined the required data domains from the access scope, the parallel execution manager 120 executes workflows configured to access those data domains in parallel. The workflows 122A-M may be lambda functions deployed on the parallel processing platform 108. Each workflow Lambda function may be configured to access a specific data domain via the respective domain API. For instance, Workflow A 122A may be configured to call domain API A 126A to retrieve "driver name" data while Workflow B 122B is configured to call domain API B 126B to retrieve "driver birthdate." The parallel execution manager 120 invokes these workflows in parallel to retrieve the required data in an optimal manner.

The parallel execution manager 120 contains optimization logic to determine the optimal set of workflows to invoke based on the access scope. For example, if a requested data field can be accessed by two workflows, the parallel execution manager 120 analyzes metrics from the monitoring engine 110 to determine which workflow executes faster and invokes just that workflow. The parallel execution manager 120 may also impose redundancy requirements where critical fields are retrieved using multiple workflows. Additionally, parallel execution manager 120 may monitor authorization scopes during execution, so that, if an unauthorized data field is detected, it terminates execution of the corresponding workflow.

In some cases, after determining the access scope, the parallel execution manager 120 may first initiate execution of all the workflows associated with the set of data domains described by the access scope (e.g., of the data domains that "intersect" with the access scope). However, during the execution, the parallel execution manager 120 may query the authorization management system 102A to determine that some of the data requested is not covered by the user's authorized access level. If the unauthorized data includes all the requested data associated with an initiated workflow, the parallel execution manager 120 may terminate the initiated workflow.

In some cases, a data field requested by a data access request may be accessible using two or more workflows. For example, the data field may be covered by two different domains (as data domains may intersect) that are accessible using two different workflows. In such cases, the parallel execution manager 120 may determine which of the two or more associated workflows based on at least one of the following logics: (i) if only associated workflow is currently available, that workflow may be used, (ii) if two or more workflows are available, the workflow that is expected to execute with a higher performance metrics may be selected, or (iii) if two or more workflows are available but the data field is marked a critical data field (e.g., by the request itself or based on the request's template), then more than one of the workflows (e.g., all of the workflows) may be selected.

The parallel execution manager 120 receives the data returned by the executed workflows and determines an output based on the received data (e.g., by combining them, by performing a routine based on them) before sending the determined output back to the client device 102. The data access platform 126 can be hosted on-premises and may contain the domain APIs 126A-N that provide access to data domains. For instance, domain API A 126A could expose an API to query a database and return results from the "driver name" data domain.

The domain APIs 126A-N enable the workflows to make calls to retrieve data in a standardized format. The domain APIs 126A-N handles interfacing with potentially complex on-premises data storage systems and databases to obtain requested data. After retrieving data from data domains, the APIs return the retrieved data to the caller workflow in a standardized format for use or consolidation by the parallel execution manager 120, thereby enabling a homogeneous parallel data access architecture.

Accordingly, environment 100 includes client device 102 that includes an authorization management system 102A and the container orchestration system 102B. Environment 100 also includes the virtual assistant server 104 with an authentication manager 104A (e.g., an MAX Salesforce Advisor engine) and the private key database 104B. The environment 100 also includes an authentication token server 106 (e.g., a Microsoft® Azure™ server configured to provide JWT tokens). The authentication token server 106 may include the token retrieval agent 106A (e.g., implemented using Apex) and an authentication database 106B, such as Azure active directory. The environment 100 also includes the parallel processing platform 108 (e.g., an AWS® platform) with the monitoring engine 110, an identity management system 112, the DNS manager 114, a firewall engine 116, an API gateway 118, a parallel execution manager 120, a set of workflows A-M 122A-M, and an authentication coordinator 124. The workflows A-M 122A-M and the authentication coordinator 124 may be lambda function engines. Examples of workflows in the car insurance context include a Verify Driver lambda advisor function and a Default Calendar advisor lambda function. The environment 100 also includes the data access platform 126 that may be on-premises with the client device 102. The data access platform 126 may include the set of domain APIs A-N 126A-N. Each domain API may enable retrieving, accessing, and/or modifying a segment of data known as a data domain. For example, the domain API A 126A may retrieving, accessing, and/or modifying data in a data domain A. Examples of data domains in a data storage system associated with an insurance company include participant data, policy data, external identifier data, and claim summary data.

In some cases, the environment 100 can be used to perform the following process. First, the container orchestration system 102B receives an end-user or an API request to access data. Subsequently, the authentication manager 104A retrieves the relevant public key from the private key database 104B associated with the client device 102 and/or the requesting user. This retrieved public key is then included in a call made to the token retrieval agent 106A. The token retrieval agent 106A verifies the received public key, and upon successful verification, retrieves an authentication token (e.g., a JWT token) from the authentication database 106B. This authentication token is then sent back to the authentication manager 104A in response to its request. After authentication manager 104A obtains the authentication token, the authentication manager 104A provides the token and the request to the DNS manager 114. The DNS manager 114 routes the data access request to the firewall engine 116, where it undergoes processing and approval. Once approved, the data access request is forwarded to the API gateway 118. Within the API gateway 118, the authentication coordinator 124 (e.g., implemented as a lambda authorizer function) validates the authentication token against the public key stored in the authentication database 106B. If the authentication coordinator 124 confirms the token's validity, the API gateway 118 proceeds to transfer the data access request to the parallel execution manager 120.

In the parallel execution phase, the parallel execution manager 120 initially determines the access scope of the data access request. This access scope may describe the specific data domains related to the requested data. Once the access scope is determined, the parallel execution manager 120 executes the workflows configured to interact with and obtain data from the corresponding APIs of the identified data domains. Each workflow is associated with a set of data domains and can access the APIs of those domains. Following the execution of workflows and data retrieval, the parallel execution manager 120 utilizes the acquired data to determine an output, which is then communicated back to the authorization management system 102A. The authorization management system 102A uses the user's access privilege level to determine how much of the output data should be displayed to the user and which subset of data may be excluded by the access privilege level.

Accordingly, environment 100 provides an intelligent and scalable system to provide controlled access to data spread across domains in an efficient manner. Client device 102 allows users to initiate data access requests which kick off an orchestrated authentication process leveraging public/private keys and JWT tokens provided by the authentication token server 106 and verified by the API gateway 118. The parallel processing platform 108 analyzes the requests and executes pre-configured workflows optimally in parallel to retrieve data fields using the domain APIs 126A-N exposed by the on-premises data access platform 126. The environment 100 balances security, performance, and fault-tolerance to enable efficient and reliable data retrieval capabilities for the organization. The parallelized workflow approach enables the environment 100 to adapt and scale as data storage needs evolve for the enterprise.

In some cases, the environment 100 enables improved computational efficiency through parallel execution of workflows. By analyzing data access requests and invoking only the required workflows in parallel, redundant execution is minimized. Unnecessary workflows are not invoked, saving computational resources. Parallel execution also enables accessing disparate data domains simultaneously, reducing latency versus sequential access.

In some cases, the environment 100 enables enhanced reliability and fault tolerance. The system provides redundancy for critical data fields (e.g., satisfies critical data field criteria) by invoking multiple workflows. If one workflow fails, the data can still be retrieved from a secondary workflow. This provides failover capabilities and removes single points of failure. Distribution of workflows across computer resources also limits the blast radius when component failures occur.

In some cases, the environment 100 enables strengthened information security. Multi-factor authentication using public/private keys and JWT tokens ensures requestors are authorized. Requests are encrypted end-to-end to prevent eavesdropping. Granular access controls also enable data field-level authorization filtering for users. Automated firewall rules provide early attack detection and prevention capabilities.

In some cases, the environment 100 enables improved storage efficiency through consolidated domain APIs. Rather than managing storage access logic independently for each system, common data retrieval logic is consolidated in the domain APIs. This simplifies data storage architectures and removes duplicated logic across systems, leading to efficient storage resource utilization. The domain APIs also enable standardized data retrieval, masking complex underlying storage implementations.

Figure 2:
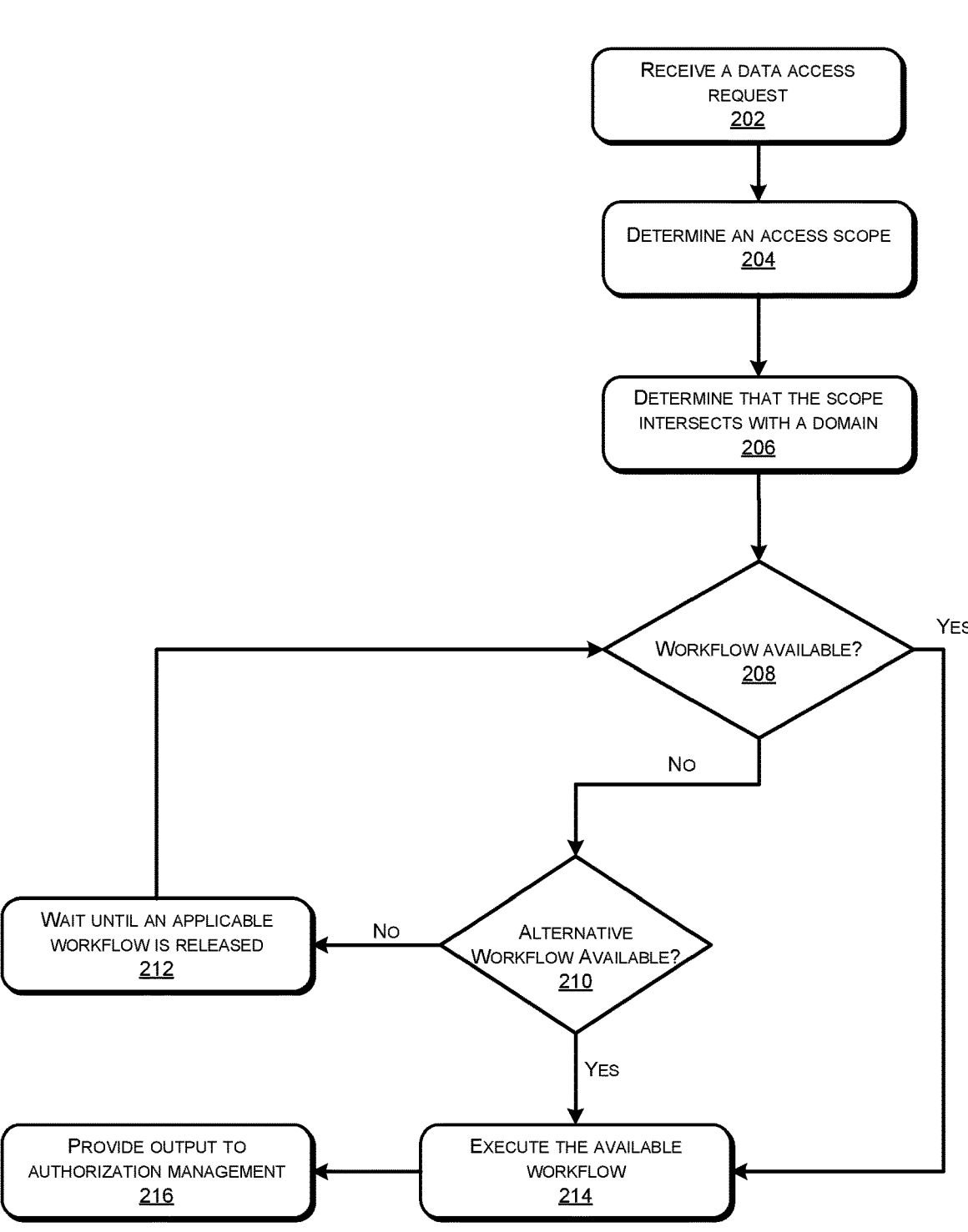
FIG. 2 is a flowchart diagram of an example process for processing a data access request.

FIG. 2 is a flowchart diagram of an example process 200 for processing a data access request. At operation 202, the DNS manager 114 receives the data access request. In some cases, the DNS manager 114 receives the data access request and an authentication token from the virtual assistant server 104.

At operation 204, the parallel execution manager 120 determines an access scope for the data access request. In some cases, after the firewall engine 116 and the authentication coordinator 124 validate the data access request, the API gateway 118 forwards the data access request to the parallel execution manager 120. To determine the access scope for the data access request, the parallel execution manager 120 may process metadata tags associated with the request.

For example, data access requests generated by the container orchestration system 102B may contain metadata like "Request_Type" and "Target_Entity" tags. The parallel execution manager 120 may maintain mappings between request types, target entity types, and the data domains needed. For a request type of "DriverVerification" and target entity "Driver," the parallel execution manager 120 may map the request to data domains like "Driver_Name" and "Driver_DOB."

In some examples, to determine the access scope for the data access request, the parallel execution manager 120 may query request templates. For example, the system may define data access request templates for common use cases like "NewHireVerification" etc. These templates may have predefined access scopes listing the data domains to access. The parallel execution manager 120 may match the request to a template to determine the mapped access scope.

In some examples, to determine the access scope for the data access request, the parallel execution manager 120 may invoke helper workflows that query knowledge bases to dynamically determine the access scope. For example, the workflows may query a mapping database that associates request parameters to data domains. The parallel execution manager 120 may also integrate with external authorization systems to get the list of authorized data fields for the requester and use this authorized access list as the access scope for the request. The access scope can also be inferred based on the identity of the requesting user or system. For example, requests from recruiting systems may scope access to candidate data domains only.

At operation 206, the parallel execution manager 120 determines that the access scope intersects with a data domain. An access scope may intersect with a data domain if at least one data field covered by the access scope is in the data domain. In some cases, the access scope is a list of data domains whose data satisfies the data access request.

At operation 208, the parallel execution manager 120 determines whether a workflow configured to retrieve data from the data domain is available. If such a workflow is not available (operation 208—No), then (at operation 210) the parallel execution manager determines whether the subset of the data requested by the data access request that is in the data domain is covered by other data domains that can be accessed using other "alternative" workflows and whether such alternative workflows are available.

For example, consider a data access platform 126 with three data domains: a data domain A, a data domain B, and a data domain C. If a data access request seeks access to a data field F1 that is in A and B, a data field F2 that is in B and C, and a data field F3 that is in C and D, and further if data domains A-C are served by workflows A-C respectively, then workflows A and B are alternative workflows that can retrieve data field F1, workflows B and C are alternative workflows that can retrieve data field F2, and workflows C and D are alternative workflows that can retrieve data field F3.

If the parallel execution manager 120 determines that neither the primary workflow nor any alternative workflows are available for accessing data in each access domain (operation 210—No), then (at operation 212) the parallel execution manager waits (e.g., for a predetermined amount of time) and returns to operation 208 to determine whether the first workflow is now available after the wait.

If the parallel execution manager 120 determines that an alternative workflow is available for access data in each access domain even though the primary workflow for accessing such data is unavailable (operation 210—Yes), then (at operation 214) the parallel execution manger executes the available alternative workflow(s).

If the parallel execution manager determines that the primary workflow for accessing data in each data domain is available (operation 208—Yes), then (at operation 214) the parallel execution manager executes the available primary workflow. After executing the available workflow(s) at operation 214, the parallel execution manager 120 proceeds to operation 216 to provide an output determined based on the retrieved data to the authorization management system 102A.

Figure 3:
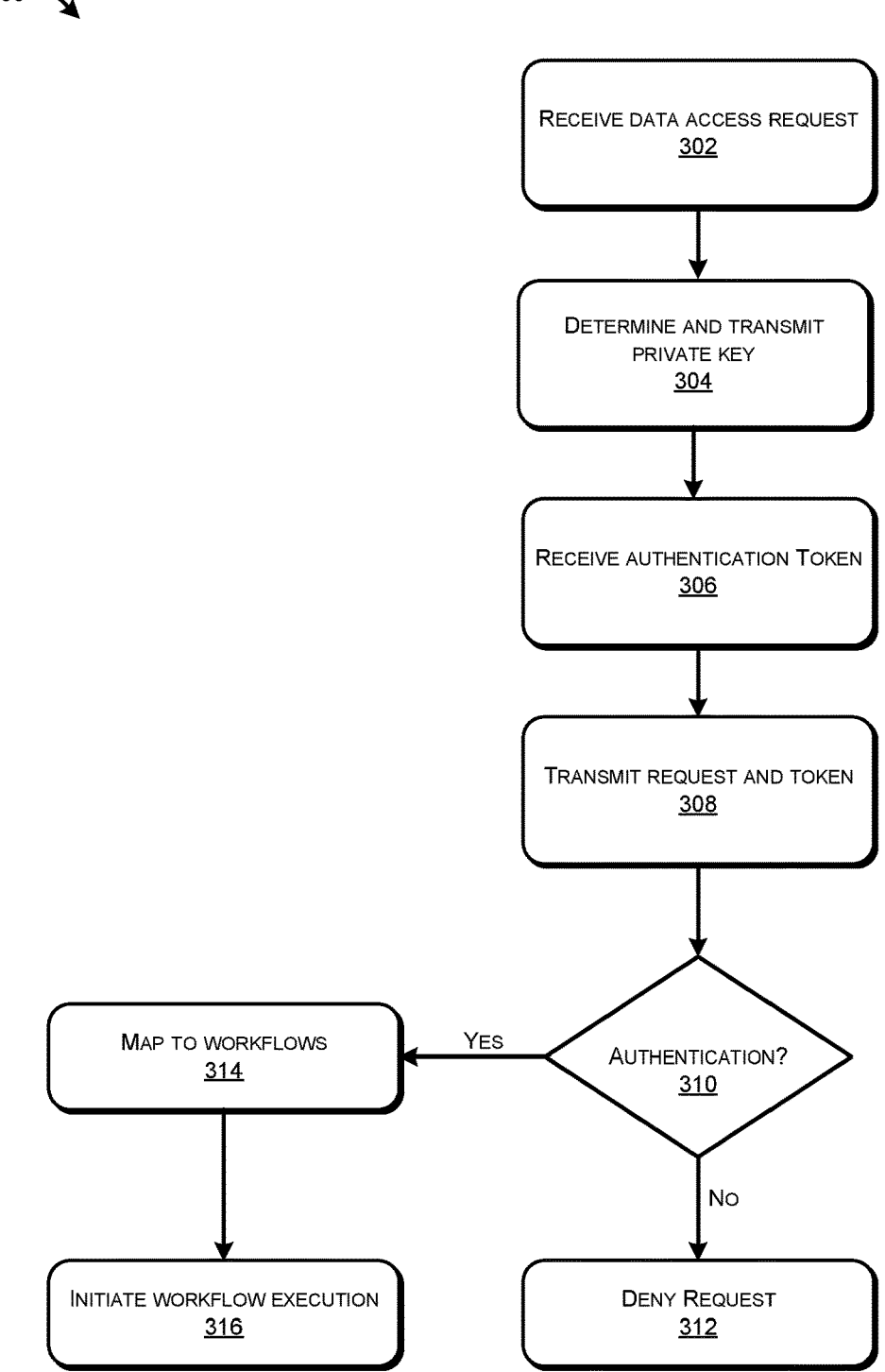
FIG. 3 is a flowchart diagram of an example process for authenticating a data access request.

FIG. 3 is a flowchart diagram of an example process 300 for authenticating a data access request. At operation 302, the authentication manager 104A receives the data access request. In some cases, the authentication manager 104A receives the data access request from the container orchestration system 102B.

At operation 304, the authentication manager 104A determines a private key for the data access request using the private key database 104B and transmits the private key to the token retrieval agent 106A. The authentication manager 104A may retrieve the requester details specified in the data access request and query the private key database 104B to identify the associated private key. For example, the private key may be tied to the user identifier or client device identifier contained in the request details. In some cases, the authentication manager 104A retrieves this private key and transmits it to the token retrieval agent 106A component on the authentication token server 106.

At operation 306, the authentication manager 104A receives an authentication token from the token retrieval agent 106A. In some cases, the token retrieval agent 106A validates the private key against the public keys stored in the authentication database 106B. If valid, the token retrieval agent 106A may retrieve and generate an authentication token corresponding to the requester, signing it using the validated public key. In some cases, the token retrieval agent 106A may transmit the generated JWT token back to the authentication manager 104A.

At operation 308, authentication manager 104A transmits the data access request and the authentication token to the DNS manager 114. In some cases, the authentication manager 104A packages the original data access request along with the JWT token into a request payload and forwards this payload to the DNS manager 114 on the parallel processing platform 108.

At operation 310, the API gateway 118 determines whether the request is valid. In some cases, the DNS manager 114 routes the request to the API gateway 118 on the parallel processing platform 108. In some cases, the API gateway 118 uses the authentication coordinator 124 to cryptographically verify the integrity of the JWT token in the request using the public key for the requestor retrieved from the authentication database 106B. In some cases, if the JWT token is valid, it means the requestor identity has been verified and the API gateway 118 marks the overall request as valid.

If the API gateway 118 determines that the request is invalid (operation 312—No), then (at operation 312) the API gateway 118 denies the request. However, if the API gateway 118 determines that the request is valid (operation 312—Yes), then (at operation 314) the parallel execution manager 120 maps the data access request to a set of workflows based on the access scope of the request. In some cases, if the request is verified, the API gateway 118 forwards it to the parallel execution manager 120 to determine the access scope for the request. In some cases, the parallel execution manager 120 maps this access scope to corresponding workflows that can retrieve the requested data domains.

At operation 316, the parallel execution manager 120 initiates the execution of the mapped workflows. In some cases, the parallel execution manager 120 triggers the concurrent execution of the mapped workflows, which access the domain APIs 126A-N to gather the requested data in parallel.

FIG. 4A provides an example of an API call 400 by a workflow of the parallel processing platform 108 to a data domain API of the data access platform 126 to access claim data. As depicted in FIG. A, the API call 400 specifies requested data by attributes such as claim type, claim identifier, claim data, policyholder data, accident data, and document data.

FIG. 4B provides an example of an API call 410 by a workflow of the parallel processing platform 108 to a data domain API of the data access platform 126 to access activity data. As depicted in FIG. 4B, the API call 410 specifies the requested data by attributes such as activity type, corresponding claim identifier, corresponding claim type, corresponding user identifier, activity description, and activity time.

Figure 5:
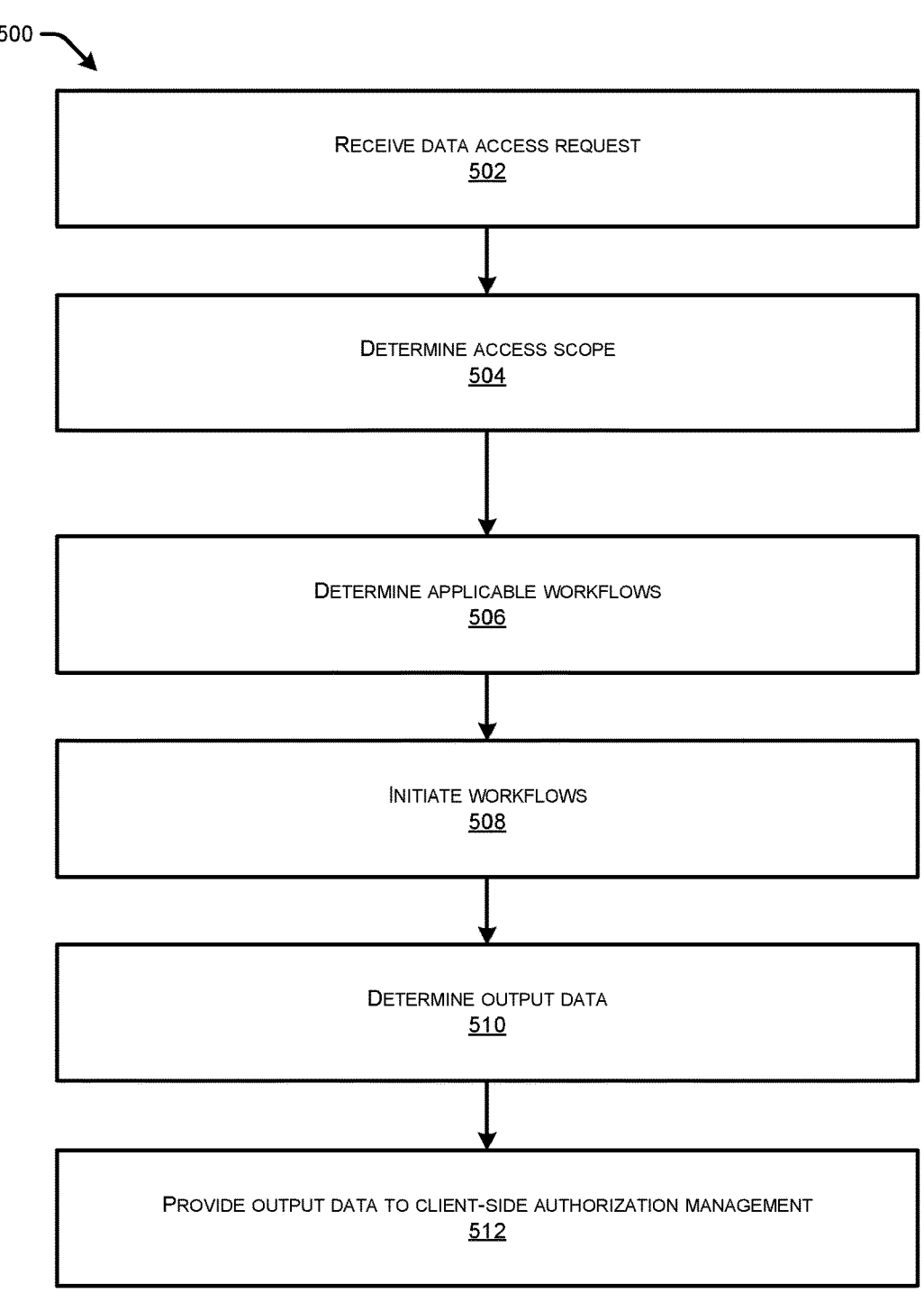
FIG. 5 is a flowchart diagram of an example process for parallel execution of operations corresponding to a data access request.

FIG. 5 is a flowchart diagram of an example process 500 for parallel execution of operations corresponding to a data access request. At operation 502, the authentication manager 104A receives the data access request. In some cases, the authentication manager 104A receives the data access request from the container orchestration system 102B.

At operation 504, the parallel execution manager 120 determines an access scope for the data access request. In some cases, after the firewall engine 116 and the authentication coordinator 124 validate the data access request, the API gateway 118 forwards the data access request to the parallel execution manager 120. To determine the access scope for the data access request, the parallel execution manager 120 may process metadata tags associated with the request. For example, the parallel execution manager 120 may analyze a "Request_Type" tag value to lookup the associated data domains.

At operation 506, the parallel execution manager 120 determines workflows associated with the data access request based on the determined access scope. In some cases, a workflow is associated with a data access request if the workflow accesses a data domain described by the request's access scope. The parallel execution manager 120 may maintain a mapping table that maps data domains to corresponding workflows configured to access those domains to look up the workflows mapped to the in-scope data domains.

At operation 508, the parallel execution manager 120 initiates execution of the workflows required to fulfil the request. The parallel execution manager 120 may trigger the concurrent execution of the mapped workflows identified in operation 506. This enables parallelized retrieval of requested data spread across domains.

At operation 510, the parallel execution manager 120 determines an output based on data retrieved by the executed workflows. In some cases, the parallel execution manager 120 monitors execution of the workflows and tracks retrieved data. While the workflows execute concurrently, the parallel execution manager 120 may use the monitoring engine 110 to track metrics and intermediate results from the executing workflows. If any workflow fails, the parallel execution manager 120 may re-execute it or trigger an alternate workflow to retrieve the same data domain.

At operation 512, the parallel execution manager 120 provides the output data to the authorization management system 102A on the requesting client device 102. In some cases, the parallel execution manager 120 consolidates and returns data from the workflows. Once workflow execution completes, the parallel execution manager 120 may consolidate the individual results returned by each workflow into a single combined payload. In some cases, the parallel execution manager 120 returns this consolidated data in response to the original data access request.

Figure 6:
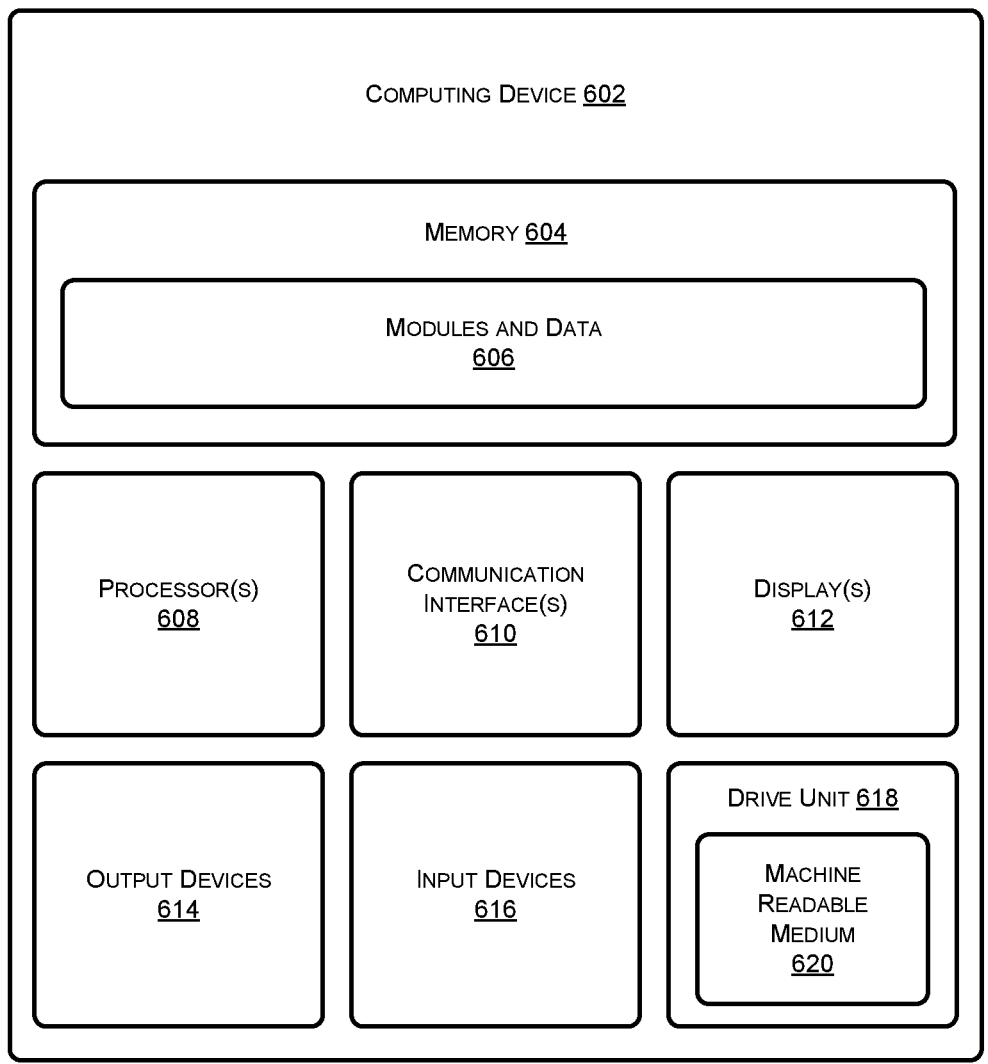
FIG. 6 shows an example system architecture for a computing device associated with the environment described herein.

FIG. 6 shows an example system architecture for a computing device 602 associated with the environment 100 described herein. A computing device 602 can be a server, computer, or other type of computing device that executes at least a portion of the environment 100. In some examples, elements of the environment 100 can be distributed among, and/or be executed by, multiple computing devices 602.

A computing device 602 can include memory 604. In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable, and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 602 associated with the environment 100. Any such non-transitory computer-readable media may be part of the computing devices 602. The memory 604 can include modules and data 606 needed to perform operations of one or more computing devices 602 of the environment 100.

One or more computing devices 602 of the environment 100 can also have processor(s) 608, communication interfaces 610, displays 612, output devices 614, input devices 616, and/or a drive unit 618 including a machine readable medium 620.

In various examples, the processor(s) 608 can be a central processing unit (CPU), a graphics processing unit (GPU), both a CPU and a GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing computer applications stored in the memory 604, which can be associated with common types of volatile (RAM) and/or nonvolatile (ROM) memory.

The communication interfaces 610 can include transceivers, modems, interfaces, antennas, telephone connections, and/or other components that can transmit and/or receive data over networks, telephone lines, or other connections.

Display 612 can be a liquid crystal display or any other type of display commonly used in computing devices. For example, a display 612 may be a touch-sensitive display screen and can then also act as an input device or keypad, such as for providing a soft-key keyboard, navigation buttons, or any other type of input.

The output devices 614 can include any sort of output devices known in the art, such as a display 612, speakers, a vibrating mechanism, and/or a tactile feedback mechanism. Output devices 614 can also include ports for one or more peripheral devices, such as headphones, peripheral speakers, and/or a peripheral display.

The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 608, and/or communication interface(s) 610 during execution thereof by the one or more computing devices 602 of the environment 100. The memory 604 and the processor(s) 608 also can constitute machine readable media 620.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
receiving, by a processor of a parallel computing platform, a data access request, wherein:
the data access request indicates an access scope, and
the parallel computing platform can request execution of a first workflow that is configured to access a first data domain, a second workflow that is configured to access a second data domain, and a third workflow that is configured to access a third data domain;
determining, by the processor, that the access scope intersects with the first data domain and the second data domain, but fails to intersect with the third data domain;

based on determining that the access scope intersects with the first data domain and the second data domain, but fails to intersect with the third data domain, initiating, by the processor, parallel execution of the first workflow and the second workflow;
based on initiating parallel execution of the first workflow and the second workflow, receiving, by the processor, first target data from the first workflow and second target data from the second workflow; and
providing, by the processor, output data comprising the first target data and the second target data to a client device, wherein the client device is configured to determine a filtered subset of the output data based on an access privilege level of the data access request.

2. The method of claim 1, wherein determining that the access scope intersects with the first data domain and the second data domain, but fails to intersect with the third data domain, comprises:
at a first time:
determining that a first data field in the access scope is in the third data domain, and
providing a first indication to the client device that the access scope intersects with the third data domain; and
at a second time:
based on the first indication, receiving, from the client device, a second indication that the access privilege level excludes the first data field, and
determining that the access scope fails to intersects with the third data domain.

3. The method of claim 2, further comprising:
initiating, by the processor and based on determining that the first data field is in the third data domain, execution of the third workflow; and
terminating, by the processor and in response to receiving the second indication, execution of the third workflow.

4. The method of claim 1, wherein the parallel computing platform can further request execution of a fourth workflow that is configured to access a fourth data domain, and wherein determining that the access scope intersects with the first data domain and the second data domain comprises:
determining that a first data field in the access scope intersects with the first data domain and the fourth data domain; and
determining at least one of: (i) that the fourth workflow is unavailable, or (ii) that the first workflow is expected to execute with a higher performance metric relative to the fourth workflow.

5. The method of claim 1, wherein the parallel computing platform can further request execution of a fourth workflow that is configured to access a fourth data domain, and the method further comprising:
determining, by the processor, that a first data field in the access scope intersects with the first data domain and the fourth data domain;
determining that the first data field is a critical data field; and
determining that the access scope intersects with the fourth data domain.

6. The method of claim 5, wherein the parallel computing platform can further request execution of a fifth workflow that is configured to access a fifth data domain, and the method further comprising:
determining, by the processor, that a second data field in the access scope intersects with the first data domain and the fifth data domain;

determining that the first data field fails to satisfy criteria for being a critical data field; and determining that the access scope fails to intersect with the fifth data domain.

7. The method of claim 1, further comprising determining, by the processor, the access scope, and wherein determining the access scope comprises:

determining that a request type of the data access request matches with a first data field and a second data field;

determining that a target entity type of the data access request matches with the first data field; and determining that the access scope includes the first data field but excludes the second data field.

8. The method of claim 7, wherein determining that the request type matches with the first data field and the second data field and determining that the target entity type matches with the first data field comprises:

initiating parallel execution of a fourth workflow that is configured to query a first database based on the request type and a fifth workflow that is configured to query a second database based on the target entity type.

9. The method of claim 8, further comprising:

at a first time:

receiving, by the processor and from the fourth workflow, a first indication that the request type matches with the first data field and the second data field, and initiating, by the processor, parallel execution of a sixth workflow configured to retrieve the first data field and a seventh workflow configured to retrieve the second data field; and at a second time:

receiving, by the processor and from the fifth workflow, a second indication that the request type matches with the first data field, and terminating, by the processor, execution of the seventh workflow.

10. The method of claim 1, further comprising:

receiving, by the processor and from an authentication token server, the data access request and an authentication token, wherein:

the authentication token server: (i) receives the data access request and a private key from a virtual assistant server, and (ii) determines the authentication token based on the private key, and the virtual assistant server: (i) receives the data access request from the client device, and (ii) retrieves the private key by querying a private key database based on a client device identifier of the client device.

11. The method of claim 1, wherein the client device enables user access to the filtered subset.

12. A computing system, comprising a processor and memory storing computer-executable instructions that, when executed by the processor, cause the computing system to perform operations comprising:

receiving, by the processor of a parallel computing platform, a data access request, wherein:

the data access request indicates an access scope, and the parallel computing platform can request execution of a first workflow that is configured to access a first data domain, a second workflow that is configured to access a second data domain, and a third workflow that is configured to access a third data domain;

determining, by the processor, that the access scope intersects with the first data domain and the second data domain, but fails to intersect with the third data domain;

based on determining that the access scope intersects with the first data domain and the second data domain, but fails to intersect with the third data domain, initiating, by the processor, parallel execution of the first workflow and the second workflow;

based on initiating parallel execution of the first workflow and the second workflow, receiving, by the processor, first target data from the first workflow and second target data from the second workflow; and providing, by the processor, output data comprising the first target data and the second target data to a client device, wherein the client device is configured to determine a filtered subset of the output data based on an access privilege level of the data access request.

13. The computing system of claim 12, wherein determining that the access scope intersects with the first data domain and the second data domain, but fails to intersect with the third data domain, comprises:

at a first time:

determining that a first data field in the access scope is in the third data domain, and providing a first indication to the client device that the access scope intersects with the third data domain; and at a second time:

based on the first indication, receiving, from the client device, a second indication that the access privilege level excludes the first data field, and determining that the access scope fails to intersects with the third data domain.

14. The computing system of claim 13, the operations further comprising:

initiating, by the processor and based on determining that the first data field is in the third data domain, execution of the third workflow; and terminating, by the processor and in response to receiving the second indication, execution of the third workflow.

15. The computing system of claim 12, wherein the parallel computing platform can further request execution of a fourth workflow that is configured to access a fourth data domain, and wherein determining that the access scope intersects with the first data domain and the second data domain comprises:

determining that a first data field in the access scope intersects with the first data domain and the fourth data domain; and determining at least one of: (i) that the fourth workflow is unavailable, or (ii) that the first workflow is expected to execute with a higher performance metric relative to the fourth workflow.

16. The computing system of claim 12, wherein the parallel computing platform can further request execution of a fourth workflow that is configured to access a fourth data domain, and the operations further comprise:

determining, by the processor, that a first data field in the access scope intersects with the first data domain and the fourth data domain;

determining that the first data field is a critical data field; and determining that the access scope intersects with the fourth data domain.

17. One or more non-transitory computer-readable media storing computer-executable instructions that, when executed by a processor, cause the processor to perform operations, comprising:

receiving, by the processor of a parallel computing platform, a data access request, wherein:

the data access request indicates an access scope, and
the parallel computing platform can request execution
of a first workflow that is configured to access a first
data domain, a second workflow that is configured to
access a second data domain, and a third workflow
that is configured to access a third data domain;
determining, by the processor, that the access scope
intersects with the first data domain and the second data
domain, but fails to intersect with the third data
domain;
based on determining that the access scope intersects with
the first data domain and the second data domain, but
fails to intersect with the third data domain, initiating,
by the processor, parallel execution of the first work-
flow and the second workflow;
based on initiating parallel execution of the first workflow
and the second workflow, receiving, by the processor,
first target data from the first workflow and second
target data from the second workflow; and
providing, by the processor, output data comprising the
first target data and the second target data to a client
device, wherein the client device is configured to
determine a filtered subset of the output data based on
an access privilege level of the data access request.

18. The one or more non-transitory computer-readable
media of claim 17, wherein determining that the access
scope intersects with the first data domain and the second
data domain, but fails to intersect with the third data domain,
comprises:
at a first time:
determining that a first data field in the access scope is
in the third data domain, and

providing a first indication to the client device that the
access scope intersects with the third data domain;
and
at a second time:
based on the first indication, receiving, from the client
device, a second indication that the access privilege
level excludes the first data field, and
determining that the access scope fails to intersects
with the third data domain.

19. The one or more non-transitory computer-readable
media of claim 18, the operations further comprising:
initiating, by the processor and based on determining that
the first data field is in the third data domain, execution
of the third workflow; and
terminating, by the processor and in response to receiving
the second indication, execution of the third workflow.

20. The one or more non-transitory computer-readable
media of claim 17, wherein the parallel computing platform
can further request execution of a fourth workflow that is
configured to access a fourth data domain, and wherein
determining that the access scope intersects with the first
data domain and the second data domain comprises:
determining that a first data field in the access scope
intersects with the first data domain and the fourth data
domain; and
determining at least one of: (i) that the fourth workflow is
unavailable, or (ii) that the first workflow is expected to
execute with a higher performance metric relative to
the fourth workflow.

* * * * *